(12) United States Patent
Zaugg

(10) Patent No.: US 9,506,506 B2
(45) Date of Patent: Nov. 29, 2016

(54) DRIVE ASSEMBLY FOR A TORQUE CONVERTER INCLUDING A SPRING RETAINER ENGAGING A CLUTCH PLATE

(71) Applicant: Schaeffler Technologies GmbH & Co. KG, Herzogenaurach (DE)

(72) Inventor: Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 161 days.

(21) Appl. No.: 14/259,987

(22) Filed: Apr. 23, 2014

(65) Prior Publication Data

US 2014/0318914 A1    Oct. 30, 2014

Related U.S. Application Data

(60) Provisional application No. 61/815,991, filed on Apr. 25, 2013.

(51) Int. Cl.
  *F16D 33/18* (2006.01)
  *F16D 3/12* (2006.01)
  *F16H 45/02* (2006.01)

(52) U.S. Cl.
  CPC .................. *F16D 33/18* (2013.01); *F16D 3/12* (2013.01); *F16H 45/02* (2013.01); *F16H 2045/0221* (2013.01)

(58) Field of Classification Search
  CPC ............... F16D 33/18; F16D 2300/22; F16D 2300/26; F16H 41/24
  See application file for complete search history.

(56) References Cited

U.S. PATENT DOCUMENTS

| 6,217,476 B1 * | 4/2001 | Muller et al. .................... 477/5 |
| 7,938,239 B2 * | 5/2011 | Heck et al. .................. 192/3.28 |
| 2009/0139819 A1 * | 6/2009 | Jameson et al. ............. 192/3.29 |
| 2012/0205213 A1 * | 8/2012 | Sudau ................. F16D 25/0635 192/3.33 |

FOREIGN PATENT DOCUMENTS

DE     WO 2011045199 A1 *   4/2011   ......... F16D 25/0635

* cited by examiner

*Primary Examiner* — Huan Le
(74) *Attorney, Agent, or Firm* — Davidson, Davidson & Kappel, LLC

(57) ABSTRACT

A drive assembly for a torque converter is provided. The drive assembly includes a spring retainer. The spring retainer includes at least one rounded portion contoured to wrap around an outer circumferential surface of at least one spring and an axial extension joined to the rounded portion. The axial extension extends axially away from rounded portion and includes a connecting portion for engaging a clutch plate. A torque converter and a method of forming a drive assembly for a torque converter are also provided.

20 Claims, 1 Drawing Sheet

DRIVE ASSEMBLY FOR A TORQUE CONVERTER INCLUDING A SPRING RETAINER ENGAGING A CLUTCH PLATE

This claims the benefit to U.S. Provisional Patent Application No. 61/815,991, filed on Apr. 25, 2013, which is hereby incorporated by reference herein.

The present disclosure relates to a drive assembly for use in a torque converter.

BACKGROUND

U.S. Publication No. 2009/0139819 discloses a torque converter including a drive plate for damper springs connected to a clutch plate.

SUMMARY OF THE INVENTION

A drive assembly for a torque converter is provided. The drive assembly includes a spring retainer. The spring retainer includes at least one rounded portion contoured to wrap around an outer circumferential surface of at least one spring and an axial extension joined to the rounded portion. The axial extension extends axially away from rounded portion and includes a connecting portion for engaging a clutch plate.

Embodiments of the drive assembly may also include one or more of the following advantageous features:

The drive assembly may further include a clutch plate, the spring retainer engaging the clutch plate. The clutch plate may include an extension and the spring retainer may include an extension engaging the extension of the clutch plate. The clutch plate may include at least one friction surface and the extension of the clutch plate may extend radially away from the at least one friction surface. The spring retainer may include a rounded portion retaining the at least one spring and the extension of the spring retainer may extend axially away from the rounded portion. The drive assembly may include a cover plate for connecting the spring retainer to the turbine shell. The drive assembly may include a drive tab for driving the at least one spring circumferentially. The drive assembly may include a cover plate and the drive tab may be formed at an end of the cover plate. The cover plate may form a first axial thrust stop for the spring retainer. The drive assembly may include an additional cover plate forming a second axial thrust stop for the spring retainer opposite the first axial thrust stop.

A torque converter is also provided. The torque converter includes a lock-up clutch including at least one friction surface and a damper assembly including an axial extension. The axial extension connects the damper assembly to the lock-up clutch radially outside of the at least one friction surface.

Embodiments of the torque converter may also include one or more of the following advantageous features:

The damper assembly may include a spring retainer and the axial extension may be part of the spring retainer. The spring retainer may include a rounded portion retaining a spring and the axial extension may extend axially away from the rounded portion. The lock-up clutch may include a radial extension that is connected to the axial extension. The torque converter may include a turbine shell and the damper assembly may be connected to the turbine shell.

A method of forming a drive assembly for a torque converter is also provided. The method includes connecting an extension of a clutch plate to an extension of a spring retainer.

Embodiments of the method may also include one or more of the following advantageous features:

The extension of the clutch plate may be a radial extension and the extension of the spring retainer may be an axial extension. The method may include positioning drive tabs circumferentially between springs retained by the spring retainer. The method may include stamping the spring retainer and a cover plate for the spring retainer from a same single piece of metal. The method may include positioning the cover plate as an axial thrust stop for the spring retainer.

BRIEF DESCRIPTION OF THE DRAWINGS

The present invention is described below by reference to the following drawings, in which.

DETAILED DESCRIPTION

Figure 1:
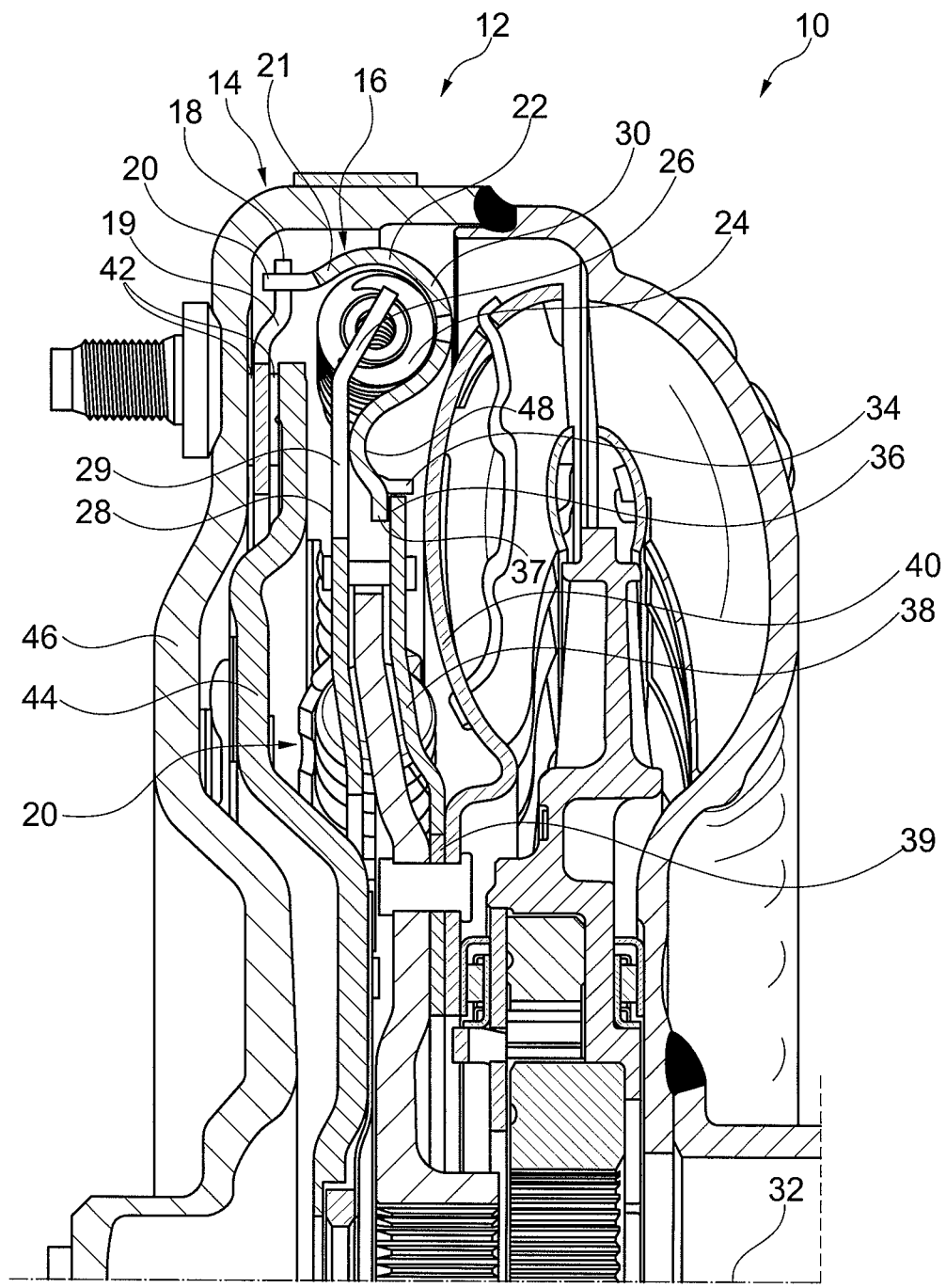
FIG. 1 shows a torque converter according to an embodiment of the present invention.

FIG. 1 shows a torque converter 10 according to an embodiment of the present invention. Torque converter 10 includes a drive assembly 12 including a lock-up clutch 14 and a damper assembly 16 connected to each other by a radial extension 18 of lock-up clutch 14 and an axial extension 20 of damper assembly 16. In this embodiment, radial extension 18 is part of a clutch plate 19 of lock-up clutch 14 and axial extension 20 is part of an outer rim 21 of a spring retainer 22, with clutch plate 19 and spring retainer 22 being directly connected to each other. Damper assembly 16 further includes arc springs 24 retained by spring retainer 22 and drive tabs 26 for circumferentially driving arc springs 24. Drive tabs 26 are formed on a radially outer end of a first cover plate 28 of damper assembly 16. Radially inside of drive tabs 26, first cover plate 28 forms a first axial thrust stop 29.

Damper assembly 16 also includes an inner damper 20, which receives circumferential forces from arc springs 24 via drive tabs 26. Spring retainer 22 includes one or more rounded portions 30 surrounding arc springs 24, which are spaced circumferentially about an axis 32 of torque converter 10, and a piloting interface 34 for interacting with a radially outer end of a second cover plate 38, which is radially positioned on a spacer ring 39 riveted to a turbine shell 40. Rounded portions 30 may include crimped portions (not shown), disposed in circumferential gaps between and in driving engagement with arc springs 24, such that torque from the spring retainer is transmitted by the crimp to spring 24 and tab 26, and vice versa. Second cover plate 38 also forms a second axial thrust stop 36 for spring retainer 22 that contacts an inner radial end 37 of spring retainer 22. Unless otherwise specified, the use of the terms radially, axially and circumferentially herein will be with respect to axis 32.

The connection between lock-up clutch 14 and damper assembly 16 of torque converter 10 may advantageously help prevent noise, commonly called squawk, from being created therein. Torque converter 10 may eliminate the root cause for the squawk without adding new components or requiring additional space. A root cause for the squawk is an uneven torsional loading on a small number of clutch plate drive tabs. When the clutch is applied, torque is transmitted from the drive tabs into arc springs. As this occurs, the drive tabs may begin to deflect and bend the body of the clutch plate, creating a small gap in the cover/clutch plate/piston interface, which is supposed to act as a seal within the torque converter. The small gap allows flow therethrough, reducing the delta pressure, and therefore reducing the torque that can be transmitted through the clutch. As the torque reduces, the deflection of the drive tabs decreases, and the cover/clutch plate/piston interface gap is eliminated. With the gap eliminated, the delta pressure builds up again and the cycle repeats itself.

Torque converter 10 may minimize or eliminate the uneven torsional loading by engaging clutch plate 19 with spring retainer 22 via extensions 18, 20. In contrast to the arrangement in U.S. Publication No. 2009/0139819, the engagement location for torque converter 10 is moved from the arc springs, via the drive tabs as in U.S. Publication No. 2009/0139819, to spring retainer 22. Such an arrangement may even out the torsional loading and eliminate squawk.

As shown in FIG. 1, clutch plate 19 includes a friction section having friction surfaces 42 on both sides thereof positioned between a piston 44 and a cover 46 of torque converter 10. Cover 46 is connectable to a crankshaft of a motor vehicle engine. Radial extension 18 of clutch plate 19 extends radially away from friction surfaces 42, with a axially bent portion interposed therebetween, and is attached to axial extension 20 of spring retainer 16. Radial portion 18 may include radially extending tabs or teeth that intermesh with axially extending tabs or teeth of axial portion 20 to engage axial portion 20. This connection between damper assembly 16 and the lock up clutch 14 formed by the interface between clutch plate 19, piston 44 and cover 46 advantageously avoids torsional bending at the connection between lock up clutch 14 and damper assembly 16 and allows clutch plate 19, piston 44 and cover 46 to create a seal without a gap resulting from torsional bending.

With further respect to damper assembly 16, spring retainer 22 preferably has an annular shape encircling axis 32 and has at least one rounded portion 30, when viewed in cross-section, contoured to wrap around an outer circumferential surface of one or more respective arc springs 24 sufficient to retain arc springs 24. A radial inner end of rounded portion 30 begins near an inner radial portion of arc spring 24 and arcs around an outer radial portion of arc spring 24 before joining axial portion 20, which extends axially away from rounded portion 30 toward cover 46. A nose 48 for contacting first axial thrust stop 29 has a rounded shape and joins the radial inner end of rounded portion 30 to piloting interface 34, which may be formed by a plurality of axially extending teeth that protrude the opposite direction as axial portion 20 and toward turbine shell 40.

Spring retainer 22 and cover plate 38 may be advantageously stamped from the same single piece of metal, which in a preferred embodiment is steel. Second axial thrust stop 36 and piloting interface 34 may only exist in a limited number of locations, allowing them to be created from scallops in cover plate 38 and then clocked during assembly. For example, spring retainer 22 may include an undulating inner circumference and cover plate 38 may have an undulating outer circumference, complementary to the spring retainer inner circumference. During forming, the two parts can "nest" together and be produced from a single piece of material. During assembly of damper 16, a radially innermost portion of the retainer inner circumference is circumferentially aligned with a radially outermost portion of the cover plate outer circumference such that the two portions radially overlap. Such an overlap would not be possible without undulating circumferences.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a torque converter comprising:
   a spring retainer rotatable about a center axis, the spring retainer comprising:
   at least one rounded portion contoured to wrap around an outer circumferential surface of at least one spring; and
   an axial extension joined to the rounded portion, the axial extension extending axially away with respect to the center axis from rounded portion and including a connecting portion for engaging a clutch plate, the rounded portion beginning radially inside of the at least one spring and extending radially outward along a turbine-side of the at least one spring before arcing around an outer radial portion of the at least one spring directly into an outer rim of the spring retainer, the axial extension being part of the outer rim.

2. A torque converter comprising the drive assembly as recited in claim 1.

3. The drive assembly as recited in claim 1 further comprising the clutch plate, the spring retainer being formed as a single piece engaging the clutch plate and retaining the at least one spring.

4. The drive assembly as recited in claim 3 wherein the clutch plate includes an extension and the axial extension of the spring retainer engages the extension of the clutch plate.

5. The drive assembly as recited in claim 4 wherein the clutch plate includes at least one friction surface, the extension of the clutch plate extending radially away from the at least one friction surface.

6. The drive assembly as recited in claim 1 further comprising a drive tab for driving the at least one spring circumferentially.

7. The drive assembly as recited in claim 6 further comprising a cover plate, the drive tab being formed at an end of the cover plate.

8. The drive assembly as recited in claim 7 wherein the cover plate forms a first axial thrust stop configured for contacting an engine-side surface of the spring retainer.

9. The drive assembly as recited in claim 8 further comprising an additional cover plate forming a second axial thrust stop configured for contacting a turbine-side surface of the spring retainer opposite the first axial thrust stop.

10. The drive assembly as recited in claim 9 wherein the spring retainer includes a nose protruding axially toward the cover plate for contacting the first axial thrust stop, the nose joining a radial inner end of rounded portion.

11. The drive assembly as recited in claim 9 wherein the second axial thrust stop contacts an inner radial end of the spring retainer.

12. The drive assembly as recited in claim 11 wherein the spring retainer splits at the inner radial end to form an axially extending piloting interface for alignment with an outer radial end of the additional cover plate and a radially extending section for contacting the second axial thrust stop surface.

13. A torque converter comprising:
   a lock-up clutch including at least one friction surface; and
   a damper assembly rotatable about a center axis, the damper assembly including at least one rounded portion contoured to wrap around an outer circumferential surface of at least one spring, the damper assembly including an axial extension, the axial extension extending axially with respect to the center axis from the rounded portion to connect the damper assembly to the lock-up clutch radially outside of the at least one friction surface, the rounded portion beginning radially inside of the at least one spring and extending radially outward along a turbine-side of the at least one spring before arcing around an outer radial portion of the at least one spring directly into an outer rim of the spring retainer, the axial extension being part of the outer rim.

14. The torque converter as recited in claim 13 wherein the damper assembly includes a spring retainer, the axial extension and the rounded portion being part of the spring retainer.

15. The torque converter as recited in claim 13 wherein the lock-up clutch includes a radial extension, the radial extension being connected to the axial extension.

16. The torque converter as recited in claim 13 further comprising a turbine shell, the damper assembly being connected to the turbine shell.

17. A method of forming a drive assembly for a torque converter comprising:
connecting an extension of a clutch plate to an extension of a spring retainer, the spring retainer being rotatable about a center axis, the spring retainer including at least one rounded portion contoured to wrap around an outer circumferential surface of at least one spring, the extension of the clutch plate extending radially with respect to the center axis from the rounded portion, the extension of the spring retainer extending axially with respect to the center axis, the rounded portion beginning radially inside of the at least one spring and extending radially outward along a turbine-side of the at least one spring before arcing around an outer radial portion of the at least one spring directly into an outer rim of the spring retainer, the axial extension being part of the outer rim.

18. The method as recited in claim 17 further comprising positioning drive tabs circumferentially between springs retained by the spring retainer.

19. The method as recited in claim 17 further comprising stamping the spring retainer and a cover plate for the spring retainer from a same single piece of metal.

20. The method as recited in claim 19 further comprising positioning the cover plate as an axial thrust stop for the spring retainer.

\* \* \* \* \*